(12) United States Patent
Nelson, Jr.

(10) Patent No.: US 9,123,113 B2
(45) Date of Patent: Sep. 1, 2015

(54) ROW GUIDANCE PARAMETERIZATION WITH HOUGH TRANSFORM

(71) Applicant: Raven Industries, Inc., Sioux Falls, SD (US)

(72) Inventor: Robert Leonard Nelson, Jr., Austin, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 249 days.

(21) Appl. No.: 13/791,515

(22) Filed: Mar. 8, 2013

(65) Prior Publication Data

US 2014/0254861 A1 Sep. 11, 2014

(51) Int. Cl.
*G06T 7/00* (2006.01)
*A01B 69/04* (2006.01)

(52) U.S. Cl.
CPC .............. *G06T 7/0061* (2013.01); *A01B 69/008* (2013.01); *G06T 2207/20061* (2013.01)

(58) Field of Classification Search
CPC ........... G06K 9/00791; G06K 9/00798; G06T 7/0036; G06T 7/0095; G06T 2207/20061; G06T 2207/30188; G06T 2207/30241
USPC .......... 382/100, 104, 110, 202, 281; 348/113, 348/118, 119, 120
See application file for complete search history.

(56) References Cited

U.S. PATENT DOCUMENTS 3,069,654 A * 12/1962 Hough ........................ 340/146.3
2006/0120622 A1 * 6/2006 Dwyer et al. ................. 382/281

\* cited by examiner

*Primary Examiner* — Andrew W Johns
(74) *Attorney, Agent, or Firm* — Schwegman Lundberg & Woessner, P.A.

(57) ABSTRACT

Systems and techniques for row guidance parameterization with Hough transform are described herein. An electronic representation of a field (ERF) can be received. The ERF can include a set of feature sets including one of a set of crop row features or a set of furrow features. A first parameter space can be produced by applying a slope-intercept Hough transform (SLIHT) to members of a feature set. Peaks in the first parameter space can be identified. A second parameter space can be produced by application of the SLIHT to the peaks. A vanishing point can be calculated based on a vanishing point peak in the second parameter space. A track-angle error can be calculated from the vanishing point.

33 Claims, 13 Drawing Sheets

ROW GUIDANCE PARAMETERIZATION WITH HOUGH TRANSFORM

BACKGROUND

Many crops that are farmed are row crops. Row crops are arranged into rows that are generally equally spaced parallel rows in a field separated by furrows. Tending row crops generally involves passing agricultural equipment (AEQ) (e.g., tractors, planters, harvesters, irrigators, fertilizers, etc.) over the field. Generally, the AEQ should follow the rows such that support structures (e.g., wheels, treads, skids, etc.) remain in the furrows so as not to damage the crops. Further, equipment dealing directly with the crops should follow the centerline of the crop rows.

Navigation systems using an external location mechanism have been employed to facilitate automatic navigation of AEQ. These systems include using global position system (GPS) units to locate the position of AEQ with respect to crop rows. Generally, these systems use an initialization operation to determine positions through which the AEQ should pass and then provide information about the current position of AEQ in a field in order to facilitate navigation. An example initialization operation can include using a GPS unit to record the movement of AEQ as the row crops are planted. This recording can later be used to guide the AEQ for subsequent operations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
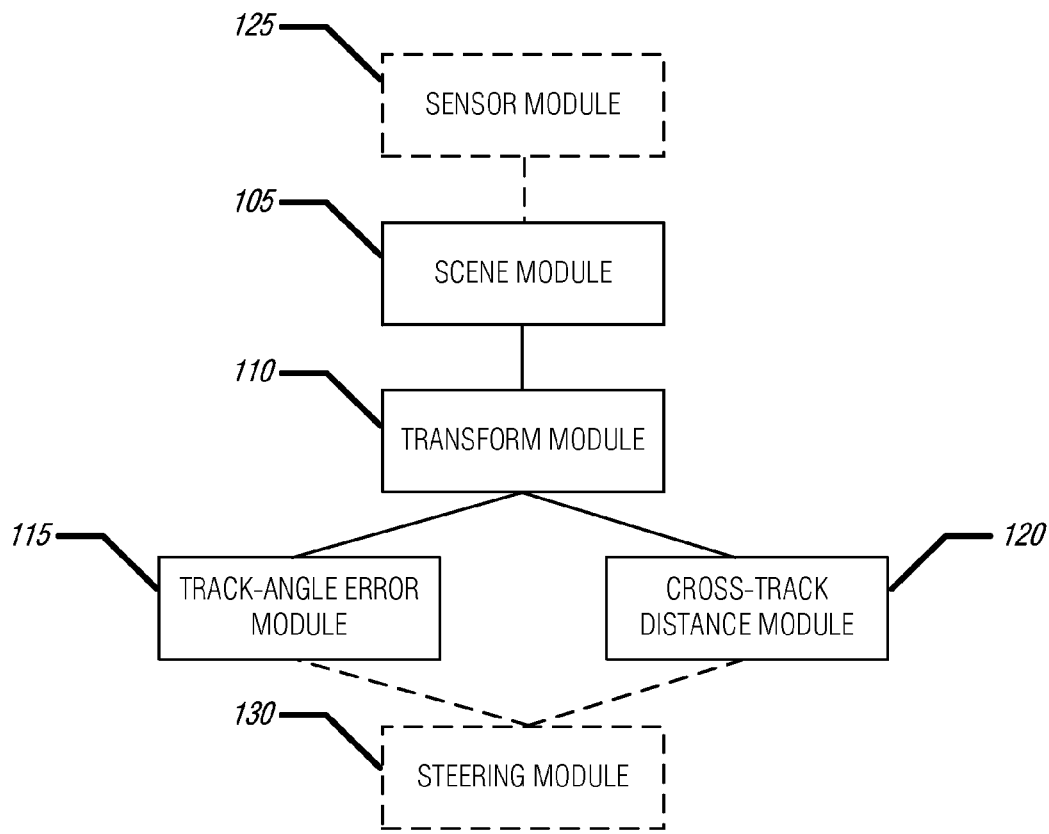
FIG. 1 illustrates an example of a system for row guidance parameterization with Hough transform, according to an embodiment.

Although modern GPS navigation can be highly accurate, it requires the initialization operation to have been performed. In cases where the row locations were not recorded at planting, or where this data is unavailable (e.g., lost or corrupted), the initialization operation needs to be performed (e.g., again or for the first time) prior to using GPS. Traditionally, the initialization operation has been performed by a human operator controlling the AEQ and recording positioning data. Using a human operator to guide the AEQ can be a tedious job requiring a skilled operator; all factors that can lead to errors and higher costs.

Computer vision (CV) can be used to guide AEQ down the crop rows. A CV navigation system generally involves a sensor, such as a camera, mounted on the AEQ to collect features (e.g., of the crop rows or furrows) of the environment. These features can be used to ascertain AEQ position relative to row or furrow positions and provide that information as parameters to a steering module to control the AEQ. One problem that can arise is a zigzag effect where the AEQ moves towards the target row and passes over it only to turn back towards the row and pass over it again. This situation occurs because the angle at which the AEQ approaches the target row is not considered in the steering calculations. Another issue that can arise in CV navigation systems can include selecting another row as a target row when the current target row is interrupted (e.g., is broken or not continuous to the sensor at a given point).

Determining two guidance parameters can address the previously mentioned problems with CV navigation systems: track-angle error (TKE) and cross-track distance (XTK). TKE involves the angle between the forward direction of the AEQ and the rows such that, when the AEQ is following the rows, the TKE is 0°, and when the AEQ is moving perpendicular to the rows, the TKE is 90°. Accordingly, the TKE can be considered the current angle-of-attack for AEQ moving towards a given row. The CV navigation system sensor data causes the generally parallel crop rows or furrows to appear to converge at a vanishing point on the horizon. This vanishing point can be used with the current orientation of the AEQ to determine the TKE.

A slope-intercept Hough transform (SLIHT) can be used to determine the vanishing point from crop row or furrow features captured by the sensor. The original Hough transform uses a parameter space with a slope of a line on one axis and an intercept of a line in a second axis where a line is expressed as y=mx+b, where m is the slope and b is the x intercept of the line in a Cartesian coordinate system. For example, each image pixel whose color matches that of the straight lines sought, may lie on any of a number of possible lines represented in the parameter space by their slope and intercept parameters. These lines may be identified by computing for each possible intercept value in the parameter space of the slope of a line from that intercept to the pixel under consideration. Additionally, or alternatively, for each possible slope value, the value may be computed at which a line of that slope would intercept the image axis. For example, slope parameters in the parameter space can be used in conjunction with the pixel to determine corresponding intercept parameters in the parameter space. For each such line, the value of that line in the parameter space is incremented. Thus, pixels from the image can contribute to numerous parameter space positions (e.g., a single pixel can cause several parameter space coordinates to be incremented). However, when several pixels fall on a line in the image, the corresponding parameter space position for that line is incremented for each of those pixels. Accordingly, that parameter space position will have a higher value than other parameter space positions that represent lines that are not found in the image.

Once all the image pixels of the color sought have contributed to the parameter-space accumulation, the parameter space can be analyzed to determine lines that are represented by the pixels in the image. These lines appear as peaks (points with high incrementation relative to other points) in the parameter space due to the cumulative effect of being incremented for each pixel lying on the line. One problem with the original Hough transform originates with the rise in unbounded parameter values in assessing vertical lines, as found when following crop rows. One solution to this problem is to use polar coordinates as parameters. Using polar coordinates, however, introduces greater computational complexity and thus cost. Instead, the original Hough transform can be modified to address the vertical line issue presented in following crop rows by reformulating the parameters from $$\frac{dy}{dx}$$

and a y intercept to a slope of $$\frac{dx}{dy}$$

and an x intercept; i.e., the lines defined by the parameter space are in the form of x=my+b. As used herein, this modification to the original Hough transform is referred to as a vertical SLIHT, and the original Hough transform is referred to as a horizontal SLIHT. Alternatively, the sensor image of the crop rows or furrows can be rotated (e.g., 90°) to reduce the vertical nature of lines corresponding to the crop rows or furrows and allow the original Hough transform to be used. As used herein, any Hough transform where the parameters are slope and intercept is SLIHT.

After applying the SLIHT to the sensor image, lines representing crop rows or furrows can be determined by analyzing the sensor image. In an example, the vanishing point can be determined by determining the intercept of two or more of these lines. In an example, the vanishing point can be determined by cascading the SLIHT. In the first parameter space, the peaks representing the converging lines fall on a line themselves in that parameter space. By applying the SLIHT to the first parameter space to produce a second parameter space (known as cascading the SLIHT), a convergence peak in the second parameter space will represent that line. The coordinates of the convergence peak are the coordinates of the vanishing point in the original sensor image with the y parameter negated. Thus, the vanishing point can be determined by cascading the SLIHT. The determined vanishing point can provide the TKE because the horizontal displacement of the vanishing point is proportional to the tangent of the TKE. In an example, the vanishing point can be used to determine the horizon in order to adjust for errors introduced by the particular perspective of the sensor.

The XTK is the distance between the current position of the AEQ and the target row or furrow. Generally, the target row or furrow is that which is closest to the AEQ, although another may be selected. Because the crop rows are generally spaced an equal distance from each other, distances between multiple lines representing the crop rows or furrows can be used to increase accuracy by reducing errors in a given distance measurement. For example, a distance between each pair of peaks can be determined, such as between peaks 1 and 2, 1 and 3, 1 and 4, 2 and 3, 2 and 4, and 3 and 4. These determined differences can be ordered based on their values. The smallest distance can be considered the spacing between rows or furrows. The largest spacing can be divided by the smallest spacing to determine the number of rows or furrows the largest determined difference encompasses. In an example, the result of the division can be rounded to the nearest integer to reflect the number of rows or furrows. The largest determined difference can be divided by the number of rows or furrows that it encompasses. Thus, error in the measurement of the peaks can be diffused among several row or furrow calculations, reducing its impact. In an example, only those peaks that fall on (within a threshold) the line represented by the convergence peak are considered in the XTK calculation. In an example, a resulting single crop-row-spacing value is approximately equal to the furrow spacing.

Once this calculation of the crop-row spacing in units of intercept pixels is complete, the differences in distance between a line from the AEQ to the vanishing point, representing a line on the field parallel to the crop rows, and the intercepts of crop rows or furrows, modulo the crop-row spacing, can be used to determine the XTK in units of the spacing in intercept pixels, then scaled to the known spacing of the actual crop rows. In an example, a peak can be added in the first parameter space at a point on the line represented by the vanishing point peak, between other peaks at the previously determined crop-row spacing, in order to infer the target crop row position when it is interrupted. In another example, the residuals of the intercept spacing of crop rows or furrow lines (first parameter space peaks) in the sensor image, modulo the crop-row spacing, may be averaged in various ways to increase accuracy and to infer the target crop-row position when it is interrupted.

Using TKE and XTK as parameters to the steering module can allow for an effective row guidance system of AEQ using CV. Thus, costs and error can be reduced in performing an initialization operation for GPS based systems, or for automatic navigation of AEQ when GPS, or other navigation systems, are unavailable. Additional details and examples are provided below.

FIG. 1 illustrates an example of a system 100 for row guidance parameterization using SLIHT. The system 100 can include a scene module 105, a transform module 110, a track-angle error module 115 and a cross-track distance module 120. In an example, the system 100 can be affixed to AEQ and arranged to facilitate CV navigation of the AEQ.

The scene module 105 can be arranged to receive an electronic representation of a field (ERF). The ERF can include any electronic representation of the field, including, a digital image (raw or compressed), a vector image, a collection of distance data (e.g., from laser range-finding, radar, etc.) translated into a digital image, or combinations of these (e.g., a plurality of raster images from multiple sources and distance data). In an example, the ERF can be captured by a sensor module 125 to which the scene module 105 is arranged to communicate. In an example, the sensor module 125 can include, or can control, a plurality of sensors. In an example, the plurality of sensors includes a digital camera (e.g., video or still). In an example, a digital camera can include a filter to at least one of color bias the captured image, increase color contrast in the captured image, or reduce information (e.g., blur) in the captured image. An example of color biasing the captured image is that of a green crop planted in red-tinted soil. A red-filter can be applied to a first sensor arranged to capture an image of the crops or a green filter can be applied to a second sensor to capture an image of the furrows. Modifying the captured image at the sensor can provide a cost-effective way to facilitate reduced processing or errors when using SLIHT, as discussed below.

The ERF can include a set of feature sets. A feature set is a set of elements that can be distinguished from the ERF and represent something in the ERF. For example, a set of crop row features can include pixels, lines, other geometric shapes, colors, etc. from the ERF that represent (e.g., correspond to) crop rows in the ERF. In an example, the set of feature sets can include a set of crop row features. In an example, the set of feature sets can include a set of furrow features.

In an example, the scene module 105 can be arranged to receive a digital image of the field (e.g., from the sensor module 125) and apply a transform to the digital image to produce the ERF. Because SLIHT operates on pixels in the ERF, modifying the original source sensor data can increase accuracy and efficiency. Accordingly, reducing the number of pixels, or providing greater clarity as to which pixels apply to crop rows or furrows, can facilitate SLIHT.

In an example, the transform can include color modeling. As used herein, color modeling is the manipulation of color information from the sensor input to a model output. The model output can be arranged to permit easier processing of various techniques described herein, such as SLIHT. For example, given green crops planted in brown soil, the colors of the source digital image can be processed, for example, to increase the contrast between these two features to better tell them apart. In an example, adjustments can be made to address different lighting effects (e.g., lighting source color temperature or shadows) such that, for example, shadowed crops can be recognized in the same manner as unshadowed crops.

In an example, color modeling can include color normalization. Color normalization can include compensating for illumination variations (e.g., from shadows due to clouds, buildings, AEQ, etc.) in the input information (e.g., removing brightness information from un-normalized pixels without altering the hue). In an example, in three dimensions, color normalization can include finding an intersection of color vector extensions having non-negative components and a surface (e.g., sphere, cube, plane, etc.). For example, a pixel's color can be represented as a Cartesian vector comprising non-negative components emphasizing various wavelengths. The wavelengths can include, but are not limited to, red, green, and blue components of visible light, infrared light, and ultraviolet light. In an example, one or more of the color vectors can be divided by the root-sum-square of their respective components. In this result, the color vectors are normalized to an octant of a sphere. In an example, the one or more color vectors can be divided by their respective largest components. In this result, the one or more color vectors are normalized to a cube with one corner at the origin and sides aligned with the color-component axes. In an example, the one or more color vectors can be divided by the sum of their respective components. In this result, the one or more color vectors are normalized to an equilateral triangular segment of a plane with its corners symmetrically located on the color component axes. In an example, the described normalizations can include projection of a normalized multi-dimensional color vector into a space of one fewer dimensions. For example, the described normalizations in three or more dimensions can include a two-dimension projection.

As previously described, the color modeling can also include resolving the colors in the source digital image to produce the ERF. For example, given the green crop, the colors that are not green can be reduced or eliminated and the contrast between the green and other colors can be increased. In an example, the color resolving can include using normalized color component vectors (e.g., as described above). In an example, the color resolving can include calculating the respective dot product of a normalized color vector with a respective radius vector of a point on the periphery of the normalization surface (e.g., sphere, cube, plane, etc.) In an example, the dot product can be compared with a threshold value to determine if it is either a target color or not. In an example, with two feature sets, thresholding can be performed on one feature set (e.g., crop rows) to determine pixels pertinent to that feature set. Pixels pertinent to the second feature set can be determined by simply taking the complement to the results of the first feature set thresholding. In an example, the color vectors can be converted to a single bit representing a pixel by the thresholding. The threshold can be one of an average, median, minimum, maximum, or other value of the resolved color component represented by the color vectors.

In an example, the color resolving can include mapping the color vectors to a sphere where saturated colors are at the equator and white is at the north pole (e.g., centered on a z-axis of the Cartesian color space). Three-dimensional color vectors from the center of the sphere can be used to ascertain pixel color values in the ERF to exaggerate contrast between the colors. In an example, the color resolving can include projecting the color cube surfaces—created using the color dimension projections onto the color cube—isometrically to a regular hexagon and then onto a hemisphere circumscribing the hexagon, where the hemisphere's center is at the plane of the hexagon and forms the origin of the projected color vectors of uniform magnitude.

In an example, the results of the color modeling (e.g., color vectors resulting from one or more of the color normalization or the color resolving) can be used to create one or more digital images comprising the ERF. In an example, individual digital images can be created for each color, so as to produce an image for the green crop and another image for the brown furrows. Other colors can be resolved for any feature set being considered. For example, instead of green, orange, pink, yellow, red, etc., can be resolved to identify a variety of crops. Further, in the case of distinctive soil (or other furrow material) colors, the distinctive color can be resolved. In this example, the collection of digital images comprise the ERF.

In an example, the transform can include downsampling the digital image. Downsampling can include reducing the resolution of the source image by applying one or more downsampling operations. In an example, the downsampling operations can use the information from a plurality of pixels to determine the value of a single downsampled pixel. In an example, the plurality of pixels can be determined by their inclusion in a pixel mask applied to the source image and corresponding to the downsampled pixel. For example, four pixels arranged in a square in the source image can be combined to determine the value of the downsampled pixel centered in the square. In an example, the combination of the source image pixels can include summing the source pixels. In an example, the combination can include averaging the source pixels. In an example, the result of the combination can be thresholded to determine the final value of the downsampled pixel.

In an example, the downsampling operations can include distortion correction. For example, a circularly symmetric lens of a camera can produce a circular distortion, centered in the source image, that causes a bowing effect known as a barrel distortion. This can be problematic when trying to determine positions for essentially straight crop rows or furrows. In an example, the distortion correction can correct the lens distortion. In an example, the distortion correction can choose source image pixels in such a way as to correct the distortion in the downsampled image. For example, independent multiplication of source pixel coordinates can be performed by an even function of the pixel's radial distance from the center of the source image to determine the downsampled pixel that will use the source pixel value. This corrects the barrel distortion without using a square-root, because an even-polynomial function approximation is equivalent to a polynomial in the square of radial distance, which is the sum of the squares of the pixel coordinates.

In an example, the transform can include removing members of a feature set. As noted above, pixels in the source image are features in a feature set. For example, green pixels can be features in the feature set of crop rows where the crop is green. Also, as discussed previously, the SLIHT is performed using these features. Accordingly, reducing the number of features in a feature set can reduce computational complexity and thus reduce costs or increase performance of the system 100. In an example, the relevant lines are centered on one of crop rows or furrows. Accordingly, data not relevant to the center of these features can be removed. In an example, removing members of the feature set includes identifying pixels on a color transition border and removing them from the feature set. For example, a green pixel next to a brown pixel (or blank pixel after removal) can be removed from the feature set. In an example, the removal is performed when the pixel has a neighbor of the same value and prevented otherwise. For example, a brown pixel with a green pixel to its left and a brown pixel to its right can be removed. However, a brown pixel with a blank pixel to both its right and left cannot be removed. This can prevent removal of pixels used to determine the center of a feature. In an example, the removal neighbor is determined in a particular direction. In an example, the particular direction is parallel to the intercept axis in the parameter space. In an example, the particular direction is horizontal.

Figure 4:
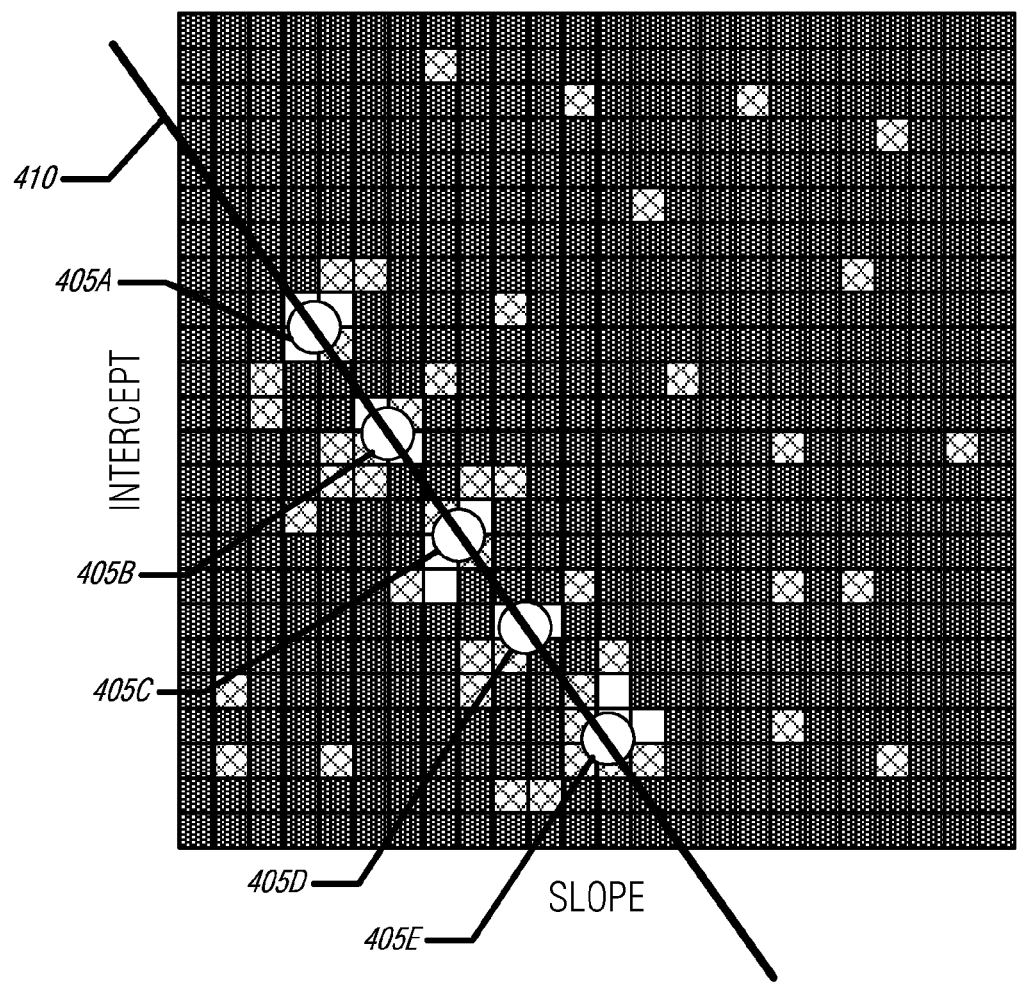
FIG. 4 illustrates an example of a Hough transform parameter space for crop rows, according to an embodiment.

The transform module 110 can be arranged to produce a first parameter space by performing a SLIHT on members of a feature set in the set of feature sets. The first parameter space includes a first slope parameter and a first intercept parameter. Producing the first parameter space using SLIHT is described above. An example of the first parameter space is illustrated in FIG. 4 and described below. In producing the first parameter space, a vertical SLIHT can be used when the orientation of the ERF is such that the crop rows or furrows are generally parallel to the direction of the perspective represented in the ERF. In an example, a horizontal SLIHT can be used by rotating the ERF 90°. Unless otherwise stated, further examples refer to vertical SLIHT; however these examples are generally applicable to horizontal SLIHT with SLIHT modifications.

Figure 5:
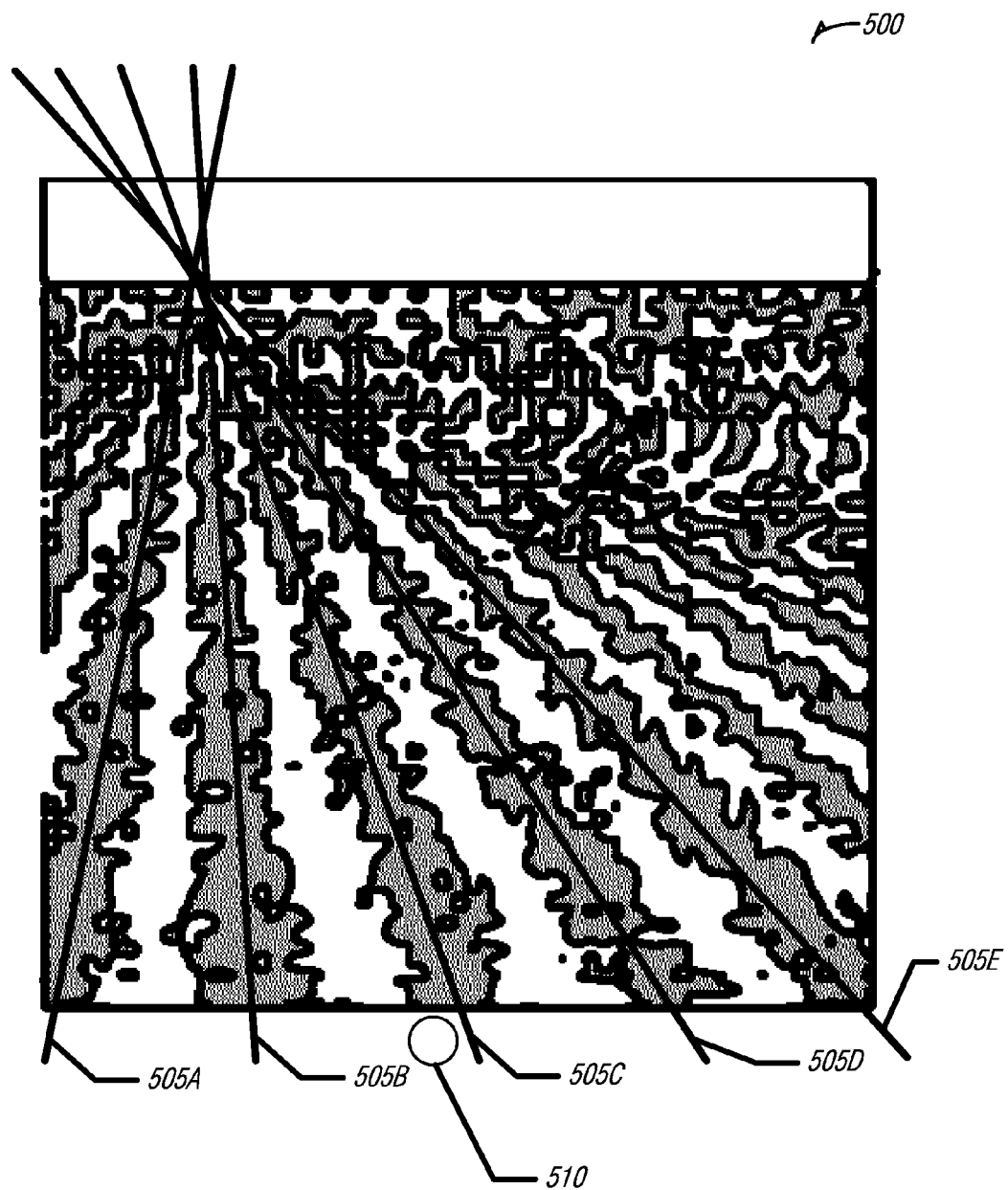
FIG. 5 illustrates an example of determined crop row lines superimposed on an electronic representation of a field, according to an embodiment.

The transform module 110 can also be arranged to identify peaks in the first parameter space. As previously described, parameter space peaks represent lines in the ERF. For example, if the crop row features are used, peaks in the first parameter space represent lines of crop rows in the ERF. As described below, FIGS. 4 and 5 illustrate this relationship. Often, the first parameter space includes many values (e.g., buckets, pixels, etc.) of varying nature. That is, given a feature set representing a wide crop row, more than one line of similar parameters can fall within the feature. This produces clusters of parameter space values. In an example, to determine a peak, parameter space values are modified based on a threshold. For example, if the value is below a threshold, it is zeroed, or if it is above the threshold, it is maximized. In an example, values above a threshold are grouped, and a geometric center of the group is used to identify the peak.

The transform module 110 can be arranged to produce a second parameter space by performing the SLIHT on the peaks. That is, SLIHT is performed on the first parameter space using the peaks as input. Because the crop rows and furrows converge to a vanishing point, the peaks in the first parameter space fall on a line within that parameter space. Thus, the second parameter space includes a peak representing this line. This peak is a vanishing point peak that can be used to calculate the vanishing point in the ERF.

Figure 6:
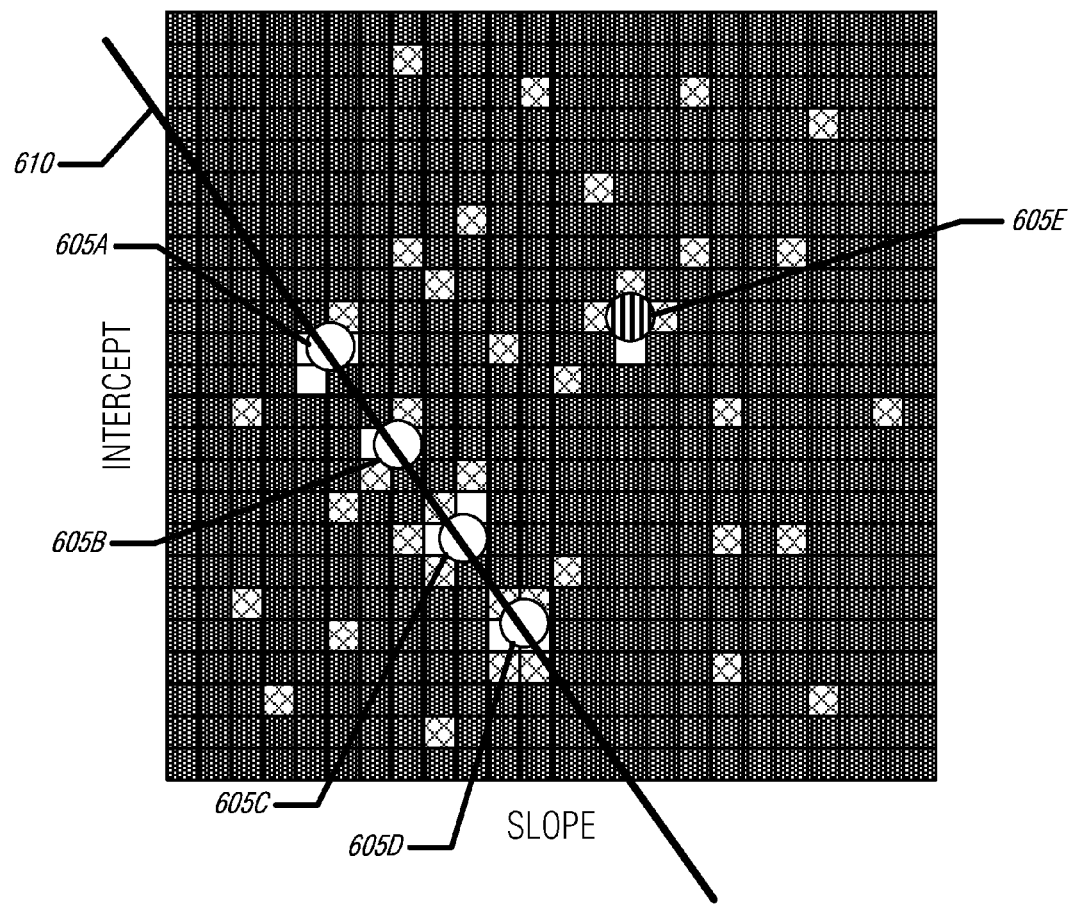
FIG. 6 illustrates an example of a Hough transform parameter space for furrows, according to an embodiment.
Figure 7:
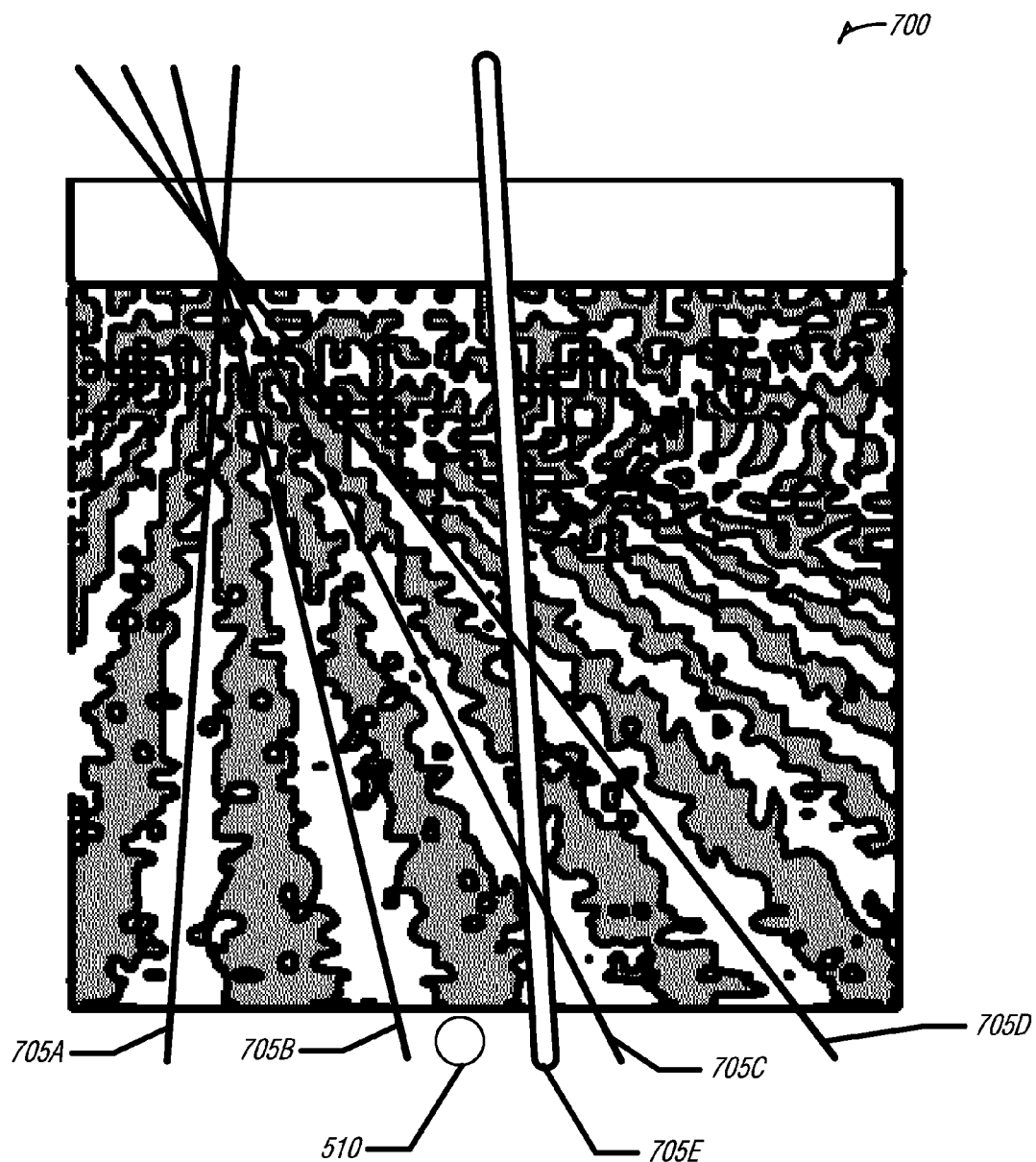
FIG. 7 illustrates an example of determined furrow lines superimposed on an electronic representation of a field, according to an embodiment.

Adding more data points can increase the accuracy of calculating the vanishing point peak location using the second SLIHT. The additional data points can come from a second feature set. For example, if the first parameter space was derived from a crop row feature set, a furrow feature set can be used to derive a third parameter space with peaks that can also be used in the second SLIHT to produce the second parameter space. In an example, to produce the second parameter space, the transform module 110 can be arranged to produce the third parameter space by performing the SLIHT on members of a second feature set in the set of feature sets. In this example, the feature set and the second feature set are different members of the set of feature sets, such as the crop row feature set and the furrow feature set. FIGS. 6 and 7 illustrate the production of the third parameter space and corresponding lines in the ERF. The transform module 110 can be arranged to identify second peaks in the third parameter space and to adjust the second parameter space with the output of performing SLIHT on the second peaks. Additional feature sets can be used while they represent lines that intersect at the vanishing point. In an example, different feature sets can have different priorities such that they are processed first, or are given greater weight in the second SLIHT calculation.

The track-angle error module 115 can be arranged to calculate the vanishing point based on the vanishing point peak in the second parameter space. As previously discussed, the vanishing point in the ERF can be determined by the vanishing point peak. In fact, the x component of the vanishing point peak in the second parameter space is the x component of the vanishing point in the ERF and the y component of the vanishing point peak is the negated y component of the vanishing point in the ERF. The following illustrates the relationship between the vanishing point peak and the vanishing point in the ERF:

The SLIHT H(p,q) of a line passing through points p and q in the ERF is:

$$H(p, q)_y = \frac{q_x - p_x}{q_y - p_y}$$

$$H(p, q)_x = p_x - p_y \cdot H(p, q)_y = q_x - q_y \cdot H(p, q)_y$$

To find the vanishing point in the ERF, two different crop rows (or furrows) can be characterized by their x intercepts, p and q, and the vanishing point v, resulting in:

$$H(p, v)_x = p_x$$

$$H(p, v)_y = \frac{v_x - p_x}{v_y}$$

$$H(q, v)_x = q_x$$

$$H(q, v)_y = \frac{v_x - q_x}{v_y}$$

The cascaded SLIHT, H(H(p, v), H(q, v)), of the line passing through these points is:

$$H(H(p, v), H(q, v))_y = \frac{q_x - p_x}{\frac{v_x - q_x}{v_y} - \frac{v_x - p_x}{v_y}} = -v_y$$

$$H(H(p, v), H(q, v))_x = p_x - \frac{v_x - p_x}{v_y} \cdot H(H(p, v), H(q, v))_y$$

$$= p_x - \frac{v_x - p_x}{v_y} \cdot -v_y = v_x$$

Thus, the vanishing point coordinates in the ERF are those of the vanishing point peak with the y component negated.

Alternatively to producing the second parameter space, the track-angle error module 115 can be arranged to plot the lines represented by the peaks in the first parameter space onto the ERF and determine their intersection. In this example, the intersection would be the vanishing point.

The track-angle error module 115 can be arranged to calculate a track-angle error (TKE) from the vanishing point. The ERF may be distorted from the actual field by, for example, the type of sensor used and the perspective of the sensor. For example, the sensor may be positioned at a downward angle to provide a clearer perspective of the crop rows and furrows. This position, however, may splay crop rows close to the sensor and constrict them towards the horizon. Because the sensor may change its angle with respect to the horizon (view dip angle) over time—for example, as it pitches up and down on uneven ground—the effect of the splay may be indeterminate prior to ascertaining the sensor's perspective with respect to the horizon. However, the vanishing point is located at the horizon and can provide the data necessary to adjust for the vertical sensor angle. In an example, to calculate the TKE from the vanishing point, the track-angle error module 115 can be arranged to calculate the view dip angle. As used herein, the view dip angle is the vertical declination of a sensor (e.g., an image capture device) from horizontal when an image of the field was taken. The track-angle error module 115 can be arranged to modify the ERF-track-angle error using the view dip angle to adjust for distortions between elements of the image and corresponding elements of the field. In an example, the following can be used to adjust for the distortions:

A horizontal plane through the sensor's point of view and the vanishing point contains a line segment from the point of view to the image. The across-track component of that line segment is the x component of the vanishing point in the image. The along-track component is the square-root of the squares of the unit distance from the point of view to the image and the y component of the vanishing point in the image. Therefore, the ratio of the y component to the root-sum-square is the negative of the tangent of TKE:

$$\tan TKE = \frac{-v_x}{\sqrt{1 + v_y^2}}$$

In an example, the track-angle error module 115 can be arranged to communicate the TKE to a steering module 130. The steering module 130 can be arranged to use the TKE as a parameter to adjust approaches to the target (e.g., crop row).

The cross-track distance module 120 can be arranged to identify a subset of peaks in the first parameter space based on a line in the first parameter space defined by the vanishing point peak. This can provide protection against an erroneously identified peak that does not represent a line intersecting the vanishing point. One such example is illustrated in FIGS. 6 and 7 and described below. In an example, where there are no erroneously identified peaks, the subset of peaks is equal to the set of peaks in the first parameter space. Third and subsequent parameter spaces and be treated in a like manner to eliminate erroneously identified peaks in those parameter spaces.

The cross-track distance module 120 can be arranged to calculate a set of intermediate intercept differences between lines represented by members in the subset of peaks. These intercept differences can be calculated on an XTK line. The XTK line is any line intersecting the lines represented by the subset of peaks. In an example, the XTK line is parallel to the intercept axis parameter of the parameter space. For example, in the vertical SLIHT, the intercept axis is the x axis. The line parallel to the x axis can be the axis itself, or another. In an example, the line parallel to the intercept axis is the bottom of the ERF in vertical SLIHT and the corresponding edge of the ERF (e.g., right or left depending on rotation) in horizontal SLIHT. Generally, the more perpendicular the XTK line is to the lines represented by the subset of peaks, the better the results become.

In an example, intermediate intercept differences can be calculated to reduce error. The calculation to reduce error can include determining a difference between every pair of members in the subset of peaks. For example, if the subset of peaks includes peak1, peak2, peak3, and peak4, the following differences (e.g., differences between corresponding lines intercepting the XTK line) can be calculated (peak1, peak2), (peak1, peak3), (peak1, peak4), (peak2, peak3), (peak2, peak4), and (peak3, peak4). The results from adjacent peaks can be binned together. For example, the pairs (peak1, peak3) and (peak2, peak4) can be binned together. In an example, the differences in each bin can be averaged to determine a single value for the bin.

The cross-track distance module 120 can be arranged to calculate a single intercept difference in the ERF based on the set of intermediate intercept axis differences. The difference (or bin) that is the smallest of the intermediate intercept differences can be used to represent a single spacing (e.g., between either crop rows or furrows). The largest difference (or bin) can be divided by single spacing to determine a ratio. This ratio can represent the number of elements encompassed by the largest difference. In an example, for non-fractional elements, the ratio can be rounded (e.g., quantized) to an integer. For example, if the ratio between the smallest and the largest difference is calculated to 1:3.347, it can be rounded to 1:3, and the largest difference can be considered to encompass four crop rows. The largest difference can be divided by the number of elements it encompasses to arrive at the single intercept difference. By performing this division, error in the intermediate intercept differences is diffused across the elements encompassed by the largest difference, resulting in reduced error for the XTK calculation. Thus, the generally equal space between the features (e.g., crop rows) can be determined and accuracy enhanced by combining the various data points from the first parameter space peaks. In an example, the above can also be applied to the third and subsequent parameter spaces to, for example, determine the distance between furrows.

The cross-track distance module 120 can be arranged to calculate the XTK based on the single intercept axis difference. In an example, the cross-track distance module 120 can be arranged to calculate a camera intercept on the XTK line for a line passing through both the vanishing point and a camera position (position line). The cross-track distance module 120 can be arranged to calculate a set of differences where each member of the set of differences is a difference between the camera intercept and an intercept on the XTK line for lines represented by the subset of peaks in the first parameter space. In an example, the cross-track distance module 120 can be arranged to apply a modulus operation to each member of the set of differences using the single intercept difference as a parameter to produce a set of results and combine the members of the set of results. The modulus operation can use the respective resultant differences and the single intercept axis difference. In an example, the results can be averaged to determine the XTK.

An example modulus operation can include summing vectors representing each peak in the subset of peaks in the first parameter space where each vector's angle is the distance between the respective line's intercept and that of the camera intercept scaled 360° per the single intercept difference. Thus, a second line away from the position line would be scaled 720°. The XTK can be calculated by summing the vectors. In an example, a similar operation can be applied to the subset of peaks in the third parameter space to produce respective vectors. To account for the intermediate position of, for example, furrows represented in the third parameter space between crop rows represented in the first parameter space, an additional 180° can be applied to the 360° scaling described above. The XTK is the angle of the vector sum.

In an example, the cross-track distance module can be arranged to determine, from the first parameter space, a missing peak based on the line represented by the vanishing point peak and the single intercept difference. For example, the subset of peaks should be spaced on the vanishing point peak line by the single intercept difference. If two peaks are spaced by a multiple greater than one on the vanishing point peak line, one or more missing peaks can be inferred at intervals of the single intercept difference along the vanishing point peak line. In an example, these missing peaks can be added to the subset of peaks in the first parameter space. In an example, after adding the missing peaks, the XTK can be the difference between the camera intercept and the closest intercept of lines represented by the subset of peaks. Using the modulus operation or replacing missing peaks can provide continuity to AEQ navigation by inferring the XTK to the target even if the target is momentarily interrupted (e.g., obscured, broken, etc.).

In an example, to calculate the XTK, the cross-track distance module 120 can be arranged to apply a set of scaling operations. In an example, intermediate results can be scaled to the ERF. In an example, the scaling can include scaling from units of spacing (e.g., swath spacing) to units of distance. In an example, the scaling can include scaling by the cosine of the TKE.

In an example, the cross-track distance module 120 can be arranged to communicate the XTK to the steering module 130. The steering module 130 can be arranged to use the XTK as a parameter to adjust approaches to the target (e.g., crop row).

FIGS. 2A-10 illustrate an example of the previously described features of the system 100. In this example, the feature sets are crop row features and furrow features.

Figure 2A:
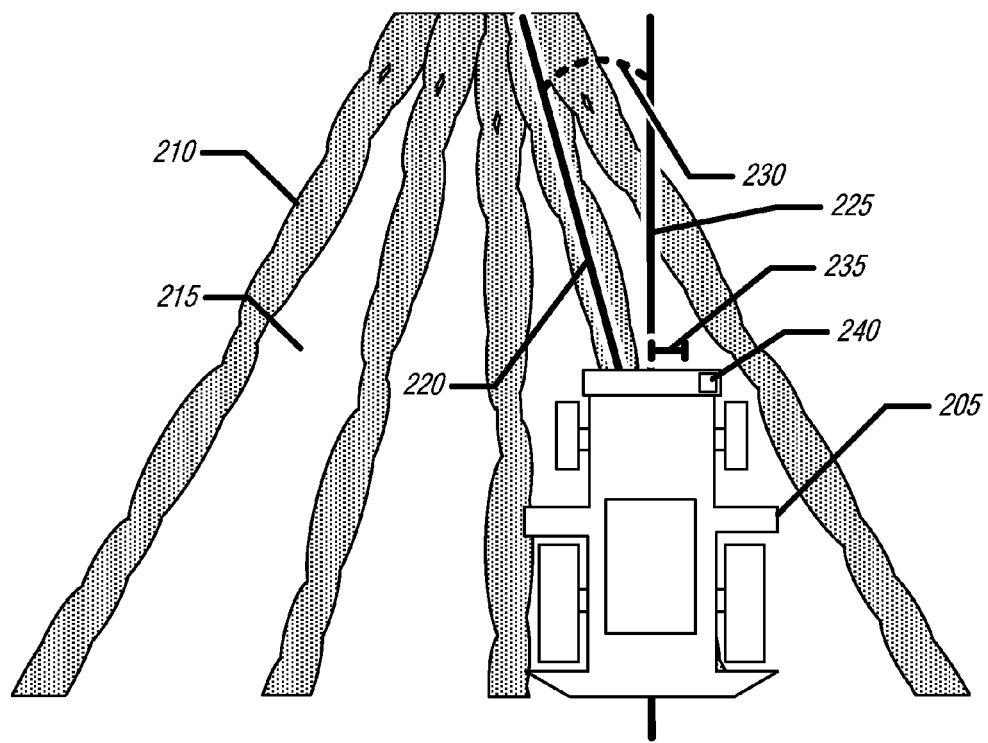
FIGS. 2A and 2B illustrate two perspectives of a vehicle in a field and row guidance parameters, according to an embodiment.

FIG. 2A illustrates a top-down view of a vehicle 205 (e.g., AEQ) in a field. The field includes crop rows 210 and furrows 215. The line 220 represents the center line of a crop row and the line 225 represents the current orientation of the vehicle 205. The angle 230 is the TKE and the distance 235 is the XTK. The vehicle 205 includes a sensor 240 arranged to produce a source image.

Figure 2B:
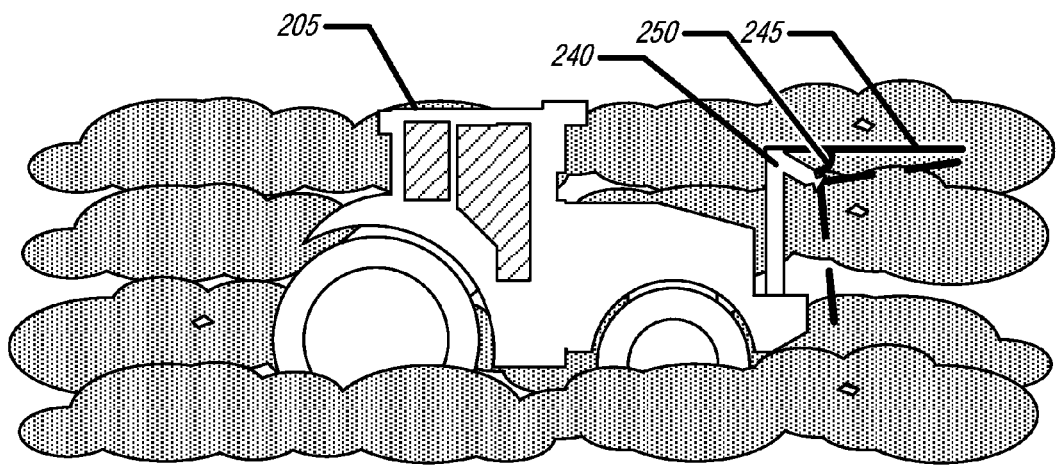

FIG. 2B illustrates a profile view of the vehicle 205 in the field. The line 245 represents the vertical orientation of the vehicle 205 with respect to the horizon and the angle 250 is the current view dip angle of the sensor 240.

Figure 3:
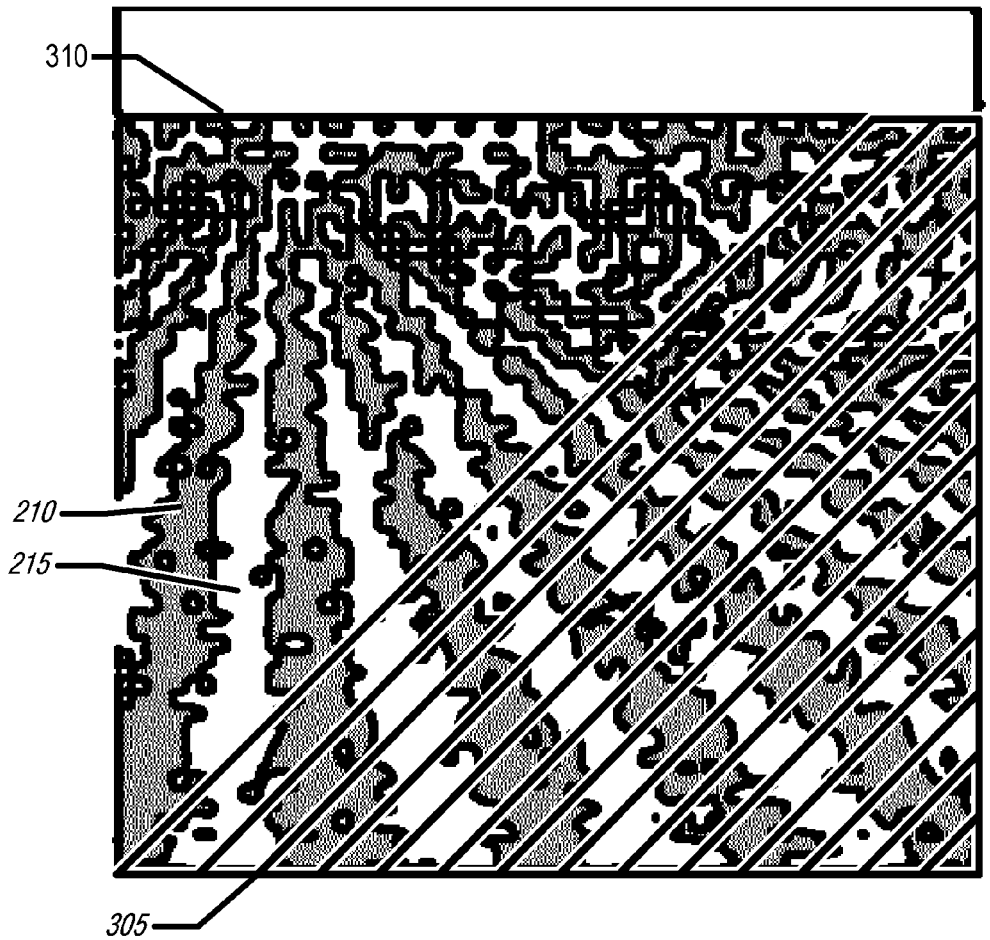
FIG. 3 illustrates an example of an electronic representation of a field used for row guidance parameterization with Hough transform, according to an embodiment.

FIG. 3 illustrates an example of an ERF 300. The ERF 300 includes the horizon 310, crop rows 210 (shaded), and furrows 215 (white). Also illustrated is a shading effect 305 represented by the diagonal stripes. As discussed above, the shading effect 305 can be removed via color modeling (e.g., color normalization).

FIG. 4 illustrates an example of a Hough transform parameter space for crop rows 400 (e.g., the first parameter space). For clarity the parameter space 400 is simplified to three values: dark, lightly shaded, and white. The dark values represent few pixels in the ERF 300 for the line represented by the parameter space position, the lightly shaded represents a medium number of pixels, and the white represents a high number of pixels. As described above, clusters of medium and high positions can be merged to determine the peaks 405A-405E. The line 410 illustrates that the peaks 405A-405E lie on a single line (and thus converge).

FIG. 5 illustrates an example of determined crop row lines superimposed on the ERF 300 to produce an ERF 500. The crop row lines 505A-505E correspond to the respective peaks 405A-405E. The sensor position 510 relative to the ERF 500 is also shown.

FIG. 6 illustrates an example of a Hough transform parameter space for furrows 600 (e.g., the third parameter space). The peaks 605A-605D are determined in the same manner described above with respect to FIG. 4. Also, the line 610 similarly demonstrates the convergence of lines represented by the peaks 605A-605D. The peak 605E illustrates an erroneously identified peak. Because the peak 605E does not lie on the line 610, it will not be considered in future XTK calculations.

FIG. 7 illustrates an example of determined furrow lines superimposed on the ERF 300 to produce an ERF 700. The furrow lines 705A-705E correspond to the respective peaks 605A-605E. Note that the line 705E does not correspond to either a crop row 210 or a furrow 215, nor does it converge with the other lines 705A-705D. Thus, the line 705E should be excluded from future calculations.

Figure 8:
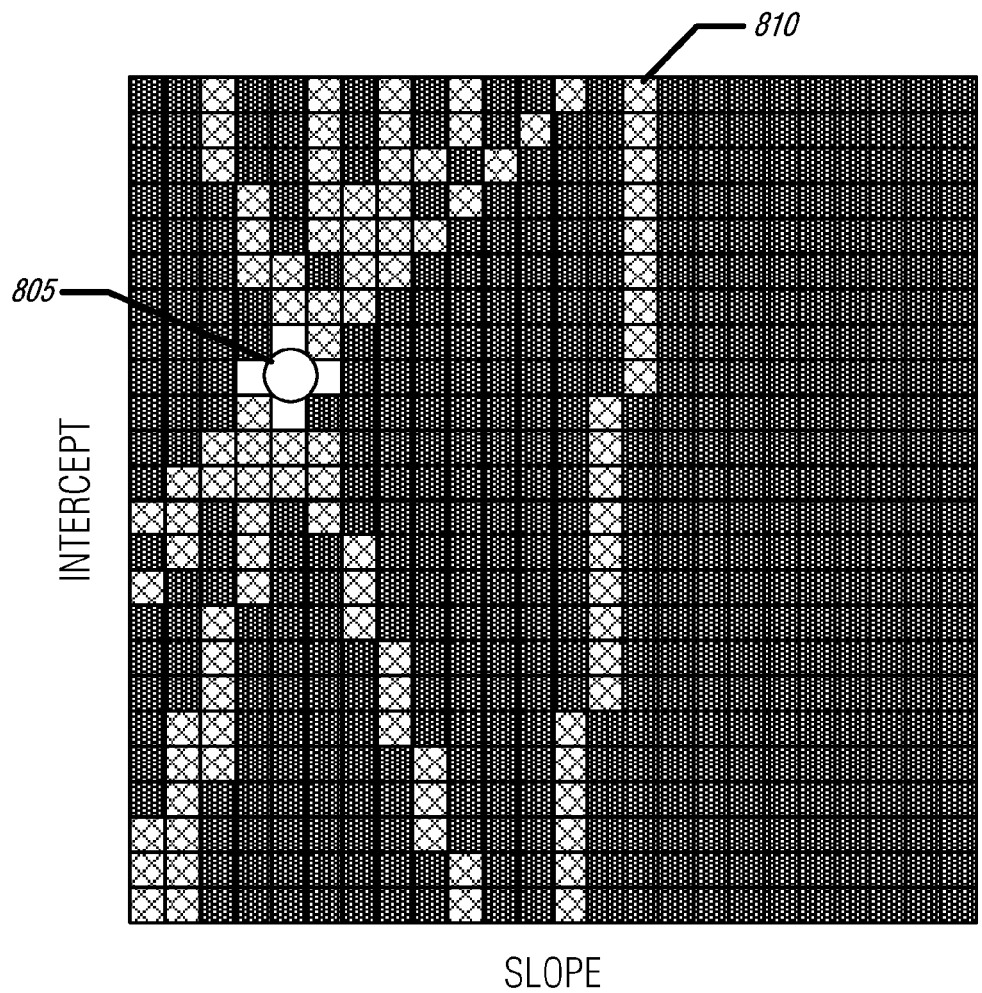
FIG. 8 illustrates an example of a Hough transform parameter space of the Hough transform spaces for crops and furrows, according to an embodiment.

FIG. 8 illustrates an example of a Hough transform parameter space 800 of the Hough transform parameter spaces for crop rows 400 and furrows 600. The peak 805 represents both the lines 410 and 610. The collection of values 810 illustrates the result of the erroneous peak 605E from the parameter space 600.

Figure 9:
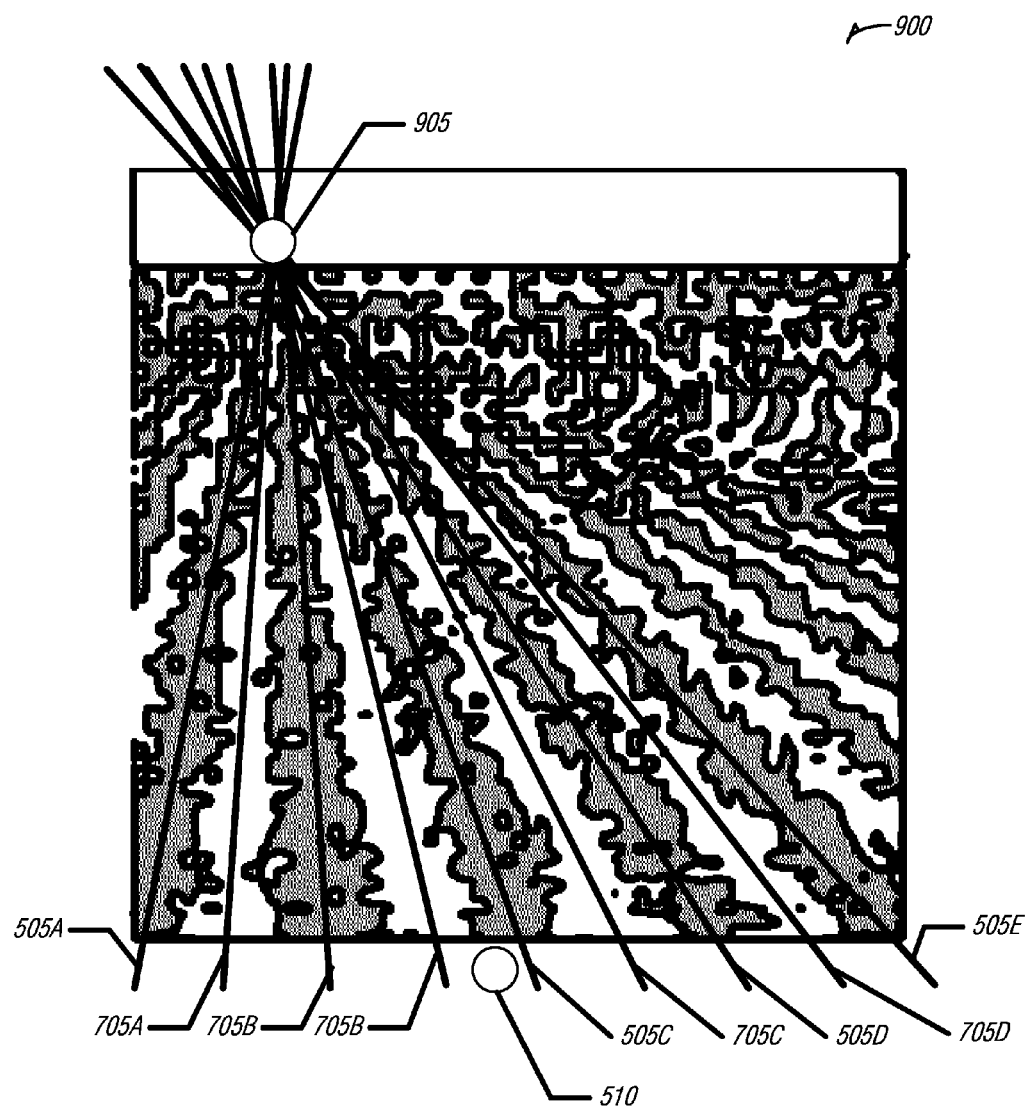
FIG. 9 illustrates an example of determined crop row lines, furrow lines, and vanishing point superimposed on an electronic representation of a field, according to an embodiment.

FIG. 9 illustrates an example of determined crop row lines 505A-505E, furrow lines 705A-705D, and vanishing point 905 superimposed on the ERF 300 to produce an ERF 900. From this data, the TKE and XTK can be determined as described above with respect to FIG. 1.

Figure 10:
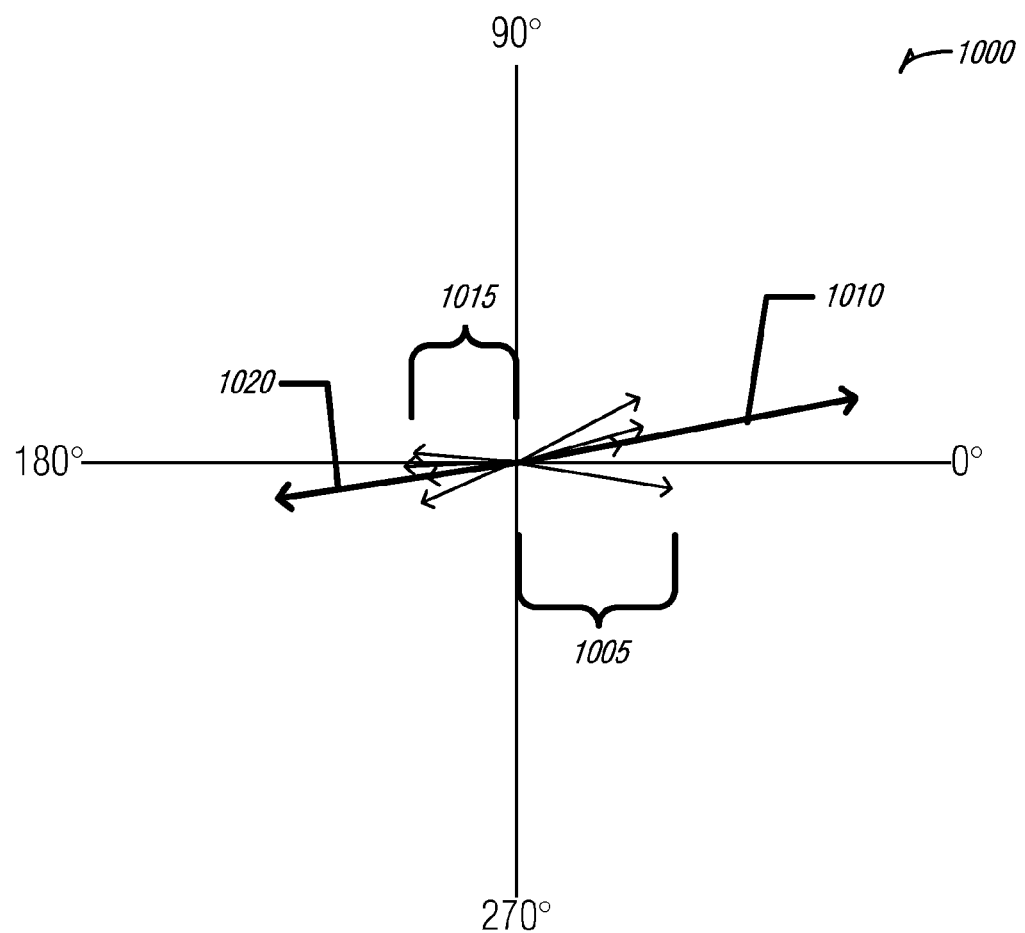
FIG. 10 illustrates an example of cross-track distance normalization, according to an embodiment.

FIG. 10 illustrates an example of a graph 1000 for cross-track distance normalization. Specifically, a rotational modulus operation is illustrated. The vectors 1005 represent the 360° scaled angular difference of crop row intercepts to the camera intercept. The vector 1010 is the sum of the vectors 1005. Similarly, the vectors 1015 represent the scaled furrow row differences to the camera intercept, before being rotated by an additional 180°, and the vector 1020 is their sum. As evident in the illustration, applying a 180° rotation to vectors 1015, or to vector 1020, causes these vectors to generally align with the vectors 1005 and vector 1020. In an example, all vectors 1005, 1010, 1015, and 1020 can be summed to produce the XTK.

Figure 11:
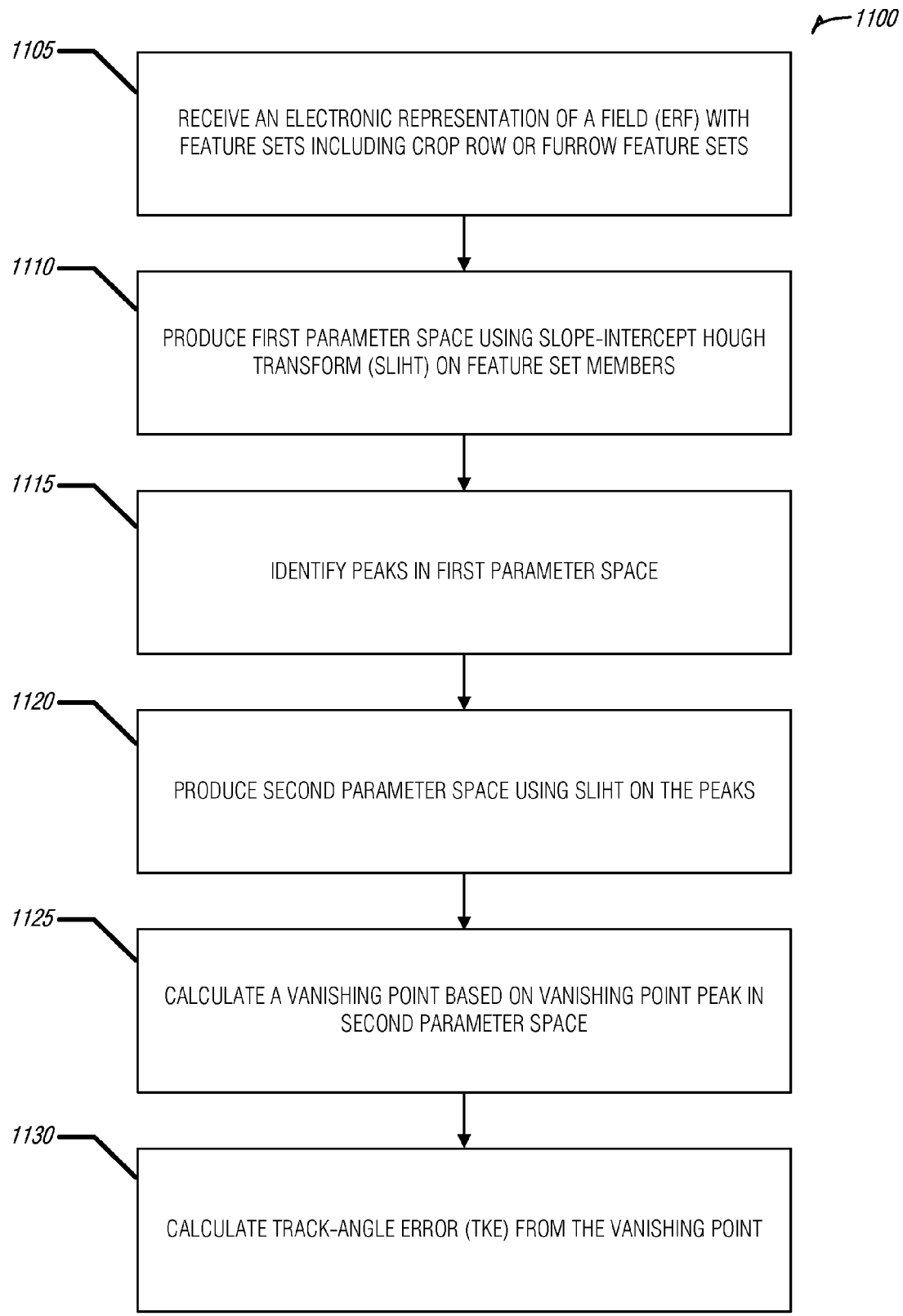
FIG. 11 illustrates an example of a method for row guidance parameterization with Hough transform, according to an embodiment.

FIG. 11 illustrates an example of a method 1100 for row guidance parameterization with Hough transform. One or more components described above can be used to perform one or more operations of the method 1100. Other capable hardware can be used to perform one or more operations of the method 1100.

At operation 1105, an ERF can be received. The ERF can include a set of feature sets. The set of feature sets can include at least one of a set of crop row features and a set of furrow features. In an example, receiving the ERF can include receiving a digital image of the field. A transform can be applied to the digital image to produce the ERF. In an example, the transform can include color modeling. In an example, the transform can include downsampling. In an example, the downsampling can include image distortion correction. In an example, the transform includes removing members of a feature set.

At operation 1110, a first parameter space can be produced by performing a SLIHT on members of a feature set in the set of feature sets. The first parameter space can include a first slope parameter and a first intercept parameter.

At operation 1115, peaks in the first parameter space can be identified.

At operation 1120, a second parameter space can be produced by performing the SLIHT on the peaks. In an example, producing the second parameter space can include producing a third parameter space by performing the SLIHT on members of a second feature set in the set of feature sets. The feature set and the second feature set are different members of the set of feature sets. Second peaks can be identified in the third parameter space and the second parameter space can be adjusted with the output of performing SLIHT on the second peaks.

At operation 1125, a vanishing point can be calculated based on a vanishing point peak in the second parameter space. Alternatively, an intersection between lines represented by any plurality to all of the peaks and the second peaks can be used to calculate the vanishing point without producing the second parameter space and corresponding vanishing point peak.

At operation 1130, a TKE can be calculated from the vanishing point. In an example, calculating the TKE from the vanishing point can include calculating a view dip angle. The view dip angle is the vertical declination of a sensor (e.g., an image capture device) from horizontal when a source image of the field was taken. An ERF-track-angle error can be modified using the view dip angle to adjust for distortions between elements of the source image and corresponding elements of the field.

Figure 12:
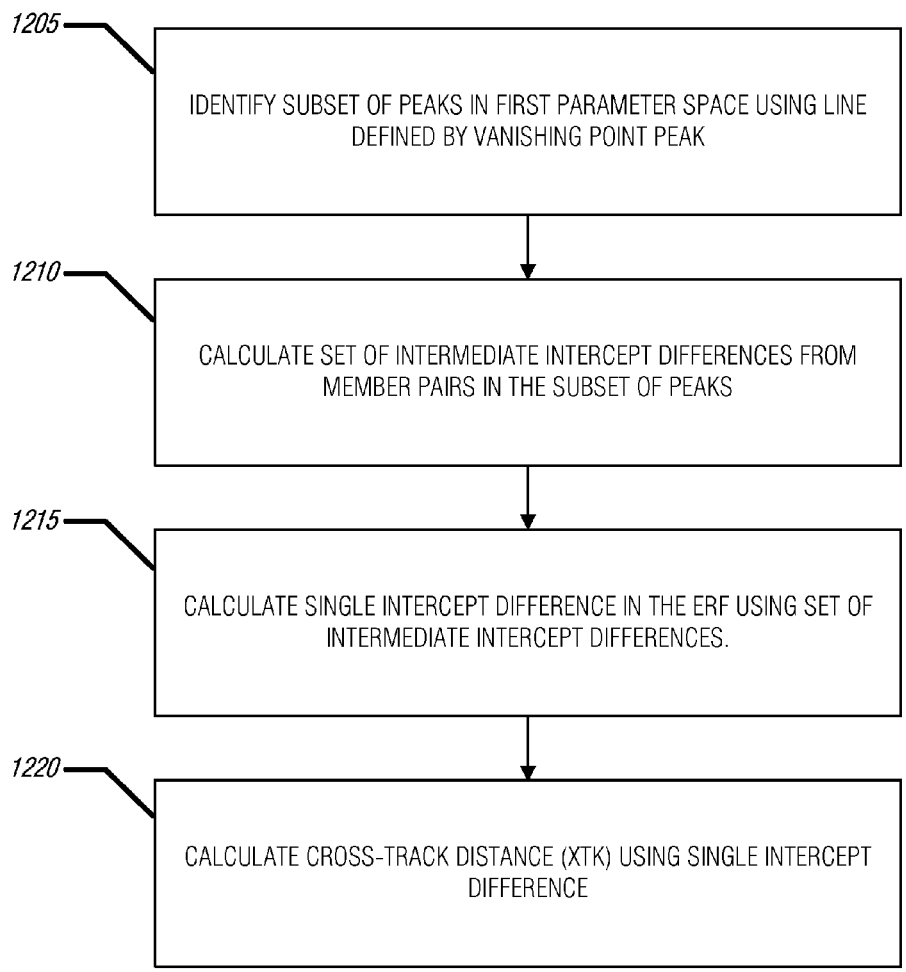
FIG. 12 illustrates an example of a method for determining a cross-track distance, according to an embodiment.

FIG. 12 illustrates an example of a method 1200 for determining a cross-track distance. One or more components described above can be used to perform one or more operations of the method 1200. Other capable hardware can be used to perform one or more operations of the method 1200.

At operation 1205, a subset of peaks can be identified in the first parameter space based on a line in the first parameter space defined by the vanishing point peak.

At operation 1210, a set of intermediate intercept differences can be calculated from member pairs in the subset of peaks. The intercept differences can be calculated on an XTK line.

At operation 1215, a single intercept difference can be calculated in the ERF based on the set of intermediate intercept axis differences.

At operation 1220, an XTK can be calculated based on the single intercept axis difference. In an example, calculating the XTK can include applying a set of scaling operations. In an example, a camera intercept on the XTK line for a line passing through both the vanishing point and a camera position can be calculated. A set of differences can be calculated. Each member of the set of differences is a difference between the camera intercept and an intercept for a line represented by a member of the subset of peaks in the first parameter space. In an example, a modulus operation can be applied to each member of the set of differences using the single intercept difference as a parameter to produce a set of results. The members of the set of results can then be combined.

Figure 13:
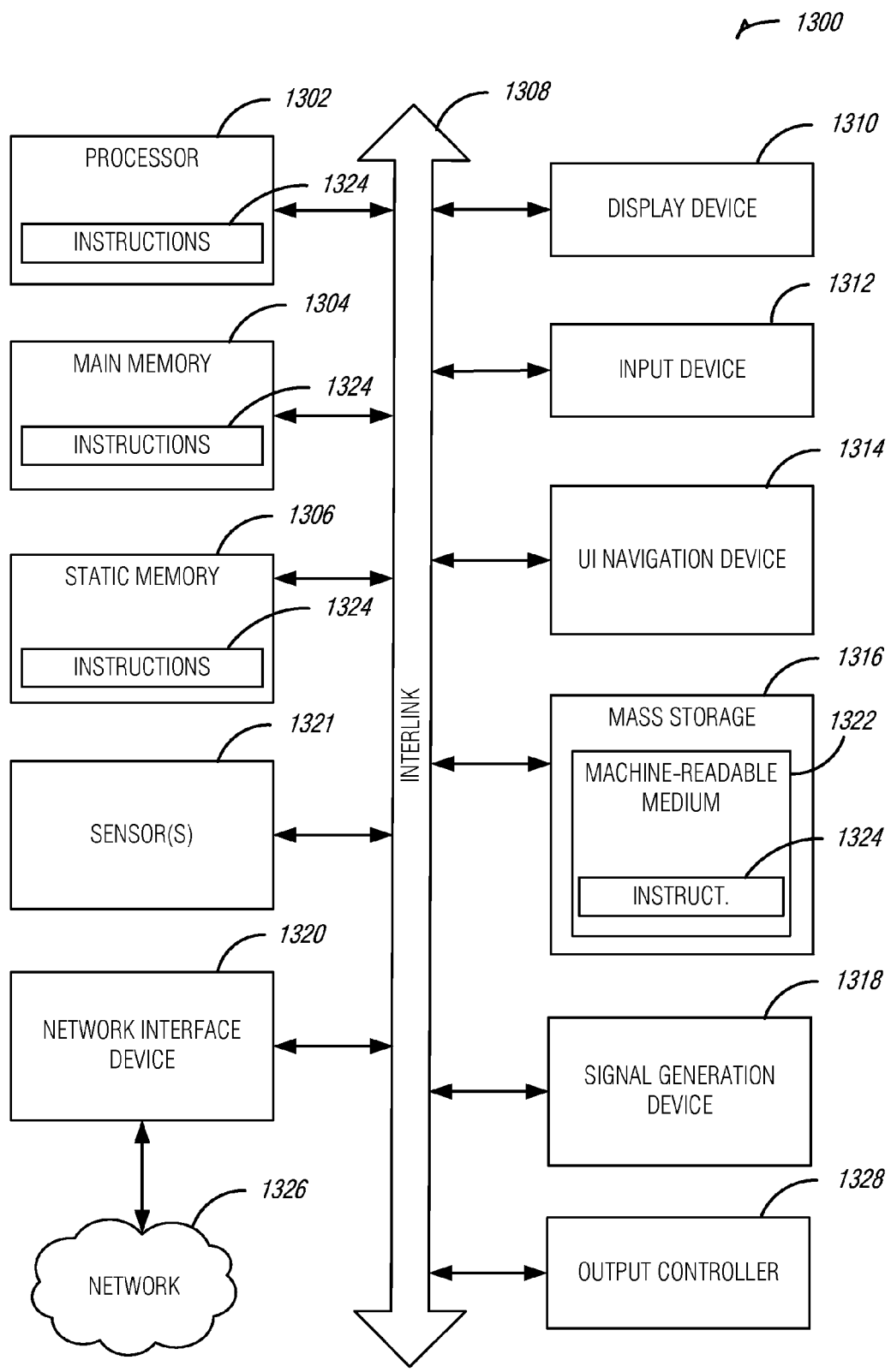
FIG. 13 is a block diagram illustrating an example of a machine upon which one or more embodiments can be implemented.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

ADDITIONAL NOTES & EXAMPLES

Example 1 can include subject matter (such as a method, means for performing acts, or machine readable medium including instructions that, when performed by a machine cause the machine to performs acts) comprising receiving an electronic representation of a field (ERF) including a set of feature sets—the set of feature sets including at least one of a set of crop row features and a set of furrow features, producing a first parameter space by performing a slope-intercept Hough transform (SLIHT) on members of a feature set in the set of feature sets—the first parameter space including a first slope parameter and a first intercept parameter, identifying peaks in the first parameter space, producing a second parameter space by performing the SLIHT on the peaks, calculating a vanishing point based on a vanishing point peak in the second parameter space, and calculating a track-angle error (TKE) from the vanishing point.

In Example 2, the subject matter of Example 1 can optionally include wherein producing the second parameter space includes producing a third parameter space by performing the SLIHT on members of a second feature set in the set of feature sets—the feature set and the second feature set being different members of the set of feature sets, identifying second peaks in the third parameter space, and adjusting the second parameter space with the output of performing SLIHT on the second peaks.

In Example 3, the subject matter of any one or more of Examples 1-2 can optionally include, wherein receiving the ERF includes receiving a digital image of the field, and applying a transform to the digital image to produce the ERF.

In Example 4, the subject matter of Example 3 can optionally include, wherein the transform includes color modeling.

In Example 5, the subject matter of any one or more of Examples 3-4 can optionally include, wherein the transform includes downsampling.

In Example 6, the subject matter of Example 5 can optionally include, wherein the downsampling includes image distortion correction.

In Example 7, the subject matter of any one or more of Examples 3-6 can optionally include, wherein the transform includes removing members of a feature set.

In Example 8, the subject matter of any one or more of Examples 1-7 can optionally include, wherein calculating the TKE from the vanishing point includes calculating a view dip angle, the view dip angle being the vertical declination of an image capture device from horizontal when an image of the field was taken, the ERF being derived from the image of the field, and modifying an ERF-track-angle error using the view dip angle to adjust for distortions between elements of the image and corresponding elements of the field.

In Example 9, the subject matter of any one or more of Examples 1-8 can optionally include, identifying a subset of peaks in the first parameter space based on a line in the first parameter space defined by the vanishing point peak, calculating a set of intermediate intercept differences from member pairs in the subset of peaks, the intercept differences calculated on an XTK line, calculating a single intercept difference in the ERF based on the set of intermediate intercept differences, and calculating a cross-track distance (XTK) based on the single intercept difference.

In Example 10, the subject matter of Example 9 can optionally include, wherein calculating the XTK includes applying a set of scaling operations.

In Example 11, the subject matter of any one or more of Examples 9-10 can optionally include, wherein calculating the XTK includes calculating a camera intercept on the XTK line for a line passing through both the vanishing point and a camera position, and calculating a set of differences, each member of the set of differences being a difference between the camera intercept and an intercept for a line represented by a member of the subset of peaks in the first parameter space, applying a modulus operation to each member of the set of differences using the single intercept difference as a parameter to produce a set of results, and combining the members of the set of results.

Example 12 can include, or may optionally be combined with the subject matter of any one of Examples 1-11 to include subject matter (such as a module, device, apparatus row guidance parameterization with Hough transform) comprising a scene module arranged to receive an electronic representation of a field (ERF) including a set of feature sets—the set of feature sets including at least one of a set of crop row features and a set of furrow features. The subject matter can also comprise a transform module arranged to produce a first parameter space by performing a slope-intercept Hough transform (SLIHT) on members of a feature set in the set of feature sets—the first parameter space including a first slope parameter and a first intercept parameter, identify peaks in the first parameter space, and produce a second parameter space by performing the SLIHT on the peaks. The subject matter can also comprise a track-angle error module arranged to calculate a vanishing point based on a vanishing point peak in the second parameter space, and calculate a track-angle error (TKE) from the vanishing point.

In Example 13, the subject matter of Example 12 can optionally include, wherein to produce the second parameter space includes the transform module arranged to produce a third parameter space by performing the SLIHT on members of a second feature set in the set of feature sets—the feature set and the second feature set being different members of the set of feature sets, identify second peaks in the third parameter space, and adjust the second parameter space with the output of performing SLIHT on the second peaks.

In Example 14, the subject matter of any one or more of Examples 12-13 can optionally include, wherein to receive the ERF includes the scene module arranged to receive a digital image of the field, and apply a transform to the digital image to produce the ERF.

In Example 15, the subject matter of Example 14 can optionally include, wherein the transform includes color modeling.

In Example 16, the subject matter of any one or more of Examples 14-15 can optionally include, wherein the transform includes downsampling.

In Example 17, the subject matter of Example 16 can optionally include, wherein the downsampling includes image distortion correction.

In Example 18, the subject matter of any one or more of Examples 14-17 can optionally include, wherein the transform includes removing members of a feature set.

In Example 19, the subject matter of any one or more of Examples 12-17 can optionally include, wherein to calculate the TKE from the vanishing point includes the track-angle error module arranged to calculate a view dip angle, the view dip angle being the vertical declination of an image capture device from horizontal when an image of the field was taken—the ERF being derived from the image of the field, and modify an ERF-track-angle error using the view dip angle to adjust for distortions between elements of the image and corresponding elements of the field.

In Example 20, the subject matter of any one or more of Examples 12-19 can optionally include a cross-track distance module arranged to identify a subset of peaks in the first parameter space based on a line in the first parameter space defined by the vanishing point peak, calculate a set of intermediate intercept differences from member pairs in the subset of peaks—the intercept differences calculated on an XTK line, calculate a single intercept difference in the ERF based on the set of intermediate intercept differences, and calculate a cross-track distance (XTK) based on the single intercept difference.

In Example 21, the subject matter of Example 20 can optionally include, wherein to calculate the XTK includes the cross-track distance module arranged to apply a set of scaling operations.

In Example 22, the subject matter of any one or more of Examples 20-21 can optionally include, wherein to calculate the XTK includes the cross-track distance module arranged to calculate a camera intercept on the XTK line for a line passing through both the vanishing point and a camera position, and calculate a set of differences, each member of the set of differences being a difference between the camera intercept and an intercept for a line represented by a member of the subset of peaks in the first parameter space, apply a modulus operation to each member of the set of differences using the single intercept difference as a parameter to produce a set of results, and combine the members of the set of results.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A non-transitory machine-readable medium (MMRM) including instructions that, when executed by a machine, cause the machine to perform operations comprising:
   receiving an electronic representation of a field (ERF) including a set of feature sets, the set of feature sets including at least one of a set of crop row features and a set of furrow features;
   producing a first parameter space by performing a slope-intercept Hough transform (SLIHT) on members of a feature set in the set of feature sets, the first parameter space including a first slope parameter and a first intercept parameter;
   identifying peaks in the first parameter space;
   producing a second parameter space by performing the SLIHT on the peaks;
   calculating a vanishing point based on a vanishing point peak in the second parameter space; and
   calculating a track-angle error (TKE) from the vanishing point.

2. The MMRM of claim 1, wherein producing the second parameter space includes:
   producing a third parameter space by performing the SLIHT on members of a second feature set in the set of feature sets, the feature set and the second feature set being different members of the set of feature sets;
   identifying second peaks in the third parameter space; and
   adjusting the second parameter space with a result from performing SLIHT on the second peaks.

3. The MMRM of claim 1, wherein receiving the ERF includes:
   receiving a digital image of the field; and
   applying a transform to the digital image to produce the ERF.

4. The MMRM of claim 3, wherein the transform includes color modeling.

5. The MMRM of claim 3, wherein the transform includes downsampling.

6. The MMRM of claim 5, wherein the downsampling includes image distortion correction.

7. The MMRM of claim 3, wherein the transform includes removing members of the feature set.

8. The MMRM of claim 1, wherein calculating the TKE from the vanishing point includes:
   calculating a view dip angle, the view dip angle being a vertical declination of an image capture device from horizontal when an image of the field was taken, the ERF being derived from the image of the field; and
   modifying an ERF-track-angle error using the view dip angle to adjust for distortions between elements of the image and corresponding elements of the field.

9. The MMRM of claim 1, wherein the instructions, when executed, cause the machine to perform operations comprising:
   identifying a subset of peaks in the first parameter space based on a line in the first parameter space defined by the vanishing point peak;
   calculating a set of intermediate intercept differences from member pairs in the subset of peaks, the intercept differences calculated on an XTK line;
   calculating a single intercept difference in the ERF based on the set of intermediate intercept differences; and
   calculating a cross-track distance (XTK) based on the single intercept difference.

10. The MMRM of claim 9, wherein calculating the XTK includes applying a set of scaling operations.

11. The MMRM of claim 9, wherein calculating the XTK includes:
    calculating a camera intercept on the XTK line for a line passing through both the vanishing point and a camera position; and
    calculating a set of differences, each member of the set of differences being a difference between the camera intercept and an intercept for a line represented by a member of the subset of peaks in the first parameter space;
    applying a modulus operation to each member of the set of differences using the single intercept difference as a parameter to produce a set of results; and
    combining the members of the set of results.

12. A system comprising:
    a scene module arranged to receive an electronic representation of a field (ERF) including a set of feature sets, the set of feature sets including at least one of a set of crop row features and a set of furrow features;

a transform module arranged to:
produce a first parameter space by performing a slope-intercept Hough transform (SLIHT) on members of a feature set in the set of feature sets, the first parameter space including a first slope parameter and a first intercept parameter;
identify peaks in the first parameter space; and
produce a second parameter space by performing the SLIHT on the peaks; and
a track-angle error module arranged to:
calculate a vanishing point based on a vanishing point peak in the second parameter space; and
calculate a track-angle error (TKE) from the vanishing point.

13. The system of claim 12, wherein to produce the second parameter space includes the transform module arranged to:
produce a third parameter space by performing the SLIHT on members of a second feature set in the set of feature sets, the feature set and the second feature set being different members of the set of feature sets;
identify second peaks in the third parameter space; and
adjust the second parameter space with a result from performing SLIHT on the second peaks.

14. The system of claim 12, wherein to receive the ERF includes the scene module arranged to:
receive a digital image of the field; and
apply a transform to the digital image to produce the ERF.

15. The system of claim 14, wherein the transform includes color modeling.

16. The system of claim 14, wherein the transform includes downsampling.

17. The system of claim 16, wherein the downsampling includes image distortion correction.

18. The system of claim 14, wherein the transform includes removing members of a feature set.

19. The system of claim 12, wherein to calculate the TKE from the vanishing point includes the track-angle error module arranged to:
calculate a view dip angle, the view dip angle being a vertical declination of an image capture device from horizontal when an image of the field was taken, the ERF being derived from the image of the field; and
modify an ERF-track-angle error using the view dip angle to adjust for distortions between elements of the image and corresponding elements of the field.

20. The system of claim 12 comprising a cross-track distance module arranged to:
identify a subset of peaks in the first parameter space based on a line in the first parameter space defined by the vanishing point peak;
calculate a set of intermediate intercept differences from member pairs in the subset of peaks, the intercept differences calculated on an XTK line;
calculate a single intercept difference in the ERF based on the set of intermediate intercept differences; and
calculate a cross-track distance (XTK) based on the single intercept difference.

21. The system of claim 20, wherein to calculate the XTK includes the cross-track distance module arranged to apply a set of scaling operations.

22. The system of claim 20, wherein to calculate the XTK includes the cross-track distance module arranged to:
calculate a camera intercept on the XTK line for a line passing through both the vanishing point and a camera position;
calculate a set of differences, each member of the set of differences being a difference between the camera intercept and an intercept for a line represented by a member of the subset of peaks in the first parameter space;
apply a modulus operation to each member of the set of differences using the single intercept difference as a parameter to produce a set of results; and
combine members of the set of results.

23. A method comprising:
receiving an electronic representation of a field (ERF) including a set of feature sets, the set of feature sets including at least one of a set of crop row features and a set of furrow features;
producing a first parameter space by performing a slope-intercept Hough transform (SLIHT) on members of a feature set in the set of feature sets, the first parameter space including a first slope parameter and a first intercept parameter;
identifying peaks in the first parameter space;
producing a second parameter space by performing the SLIHT on the peaks;
calculating a vanishing point based on a vanishing point peak in the second parameter space; and
calculating a track-angle error (TKE) from the vanishing point.

24. The method of claim 23, wherein producing the second parameter space includes:
producing a third parameter space by performing the SLIHT on members of a second feature set in the set of feature sets, the feature set and the second feature set being different members of the set of feature sets;
identifying second peaks in the third parameter space; and
adjusting the second parameter space with a result from performing SLIHT on the second peaks.

25. The method of claim 23, wherein receiving the ERF includes:
receiving a digital image of the field; and
applying a transform to the digital image to produce the ERF.

26. The method of claim 25, wherein the transform includes color modeling.

27. The method of claim 25, wherein the transform includes downsampling.

28. The method of claim 27, wherein the downsampling includes image distortion correction.

29. The method of claim 25, wherein the transform includes removing members of the feature set.

30. The method of claim 23, wherein calculating the TKE from the vanishing point includes:
calculating a view dip angle, the view dip angle being a vertical declination of an image capture device from horizontal when an image of the field was taken, the ERF being derived from the image of the field; and
modifying an ERF-track-angle error using the view dip angle to adjust for distortions between elements of the image and corresponding elements of the field.

31. The method of claim 23 comprising:
identifying a subset of peaks in the first parameter space based on a line in the first parameter space defined by the vanishing point peak;
calculating a set of intermediate intercept differences from member pairs in the subset of peaks, the intercept differences calculated on an XTK line;
calculating a single intercept difference in the ERF based on the set of intermediate intercept differences; and
calculating a cross-track distance (XTK) based on the single intercept difference.

32. The method of claim 31, wherein calculating the XTK includes applying a set of scaling operations.

33. The method of claim 31, wherein calculating the XTK includes:
- calculating a camera intercept on the XTK line for a line passing through both the vanishing point and a camera position;
- calculating a set of differences, each member of the set of differences being a difference between the camera intercept and an intercept for a line represented by a member of the subset of peaks in the first parameter space;
- applying a modulus operation to each member of the set of differences using the single intercept difference as a parameter to produce a set of results; and
- combining the members of the set of results.

* * * * *